US012718643B2

(12) United States Patent
Falor et al.

(10) Patent No.: US 12,718,643 B2
(45) **Date of Patent: *Aug. 25, 2026**

(54) SYSTEM AND METHOD FOR DETERMINING VOTER ELIGIBILITY AND FACILITATING SECURE ELECTRONIC VOTING

(71) Applicant: JPMorgan Chase Bank, N.A., New York, NY (US)

(72) Inventors: Kenneth Falor, Carrollton, TX (US); Adam Belvin, Cypress, TX (US); Sebastian Cassano, Capital Federal (AR); Mohammed Aijaaz, Secunderabad (IN); James Templet, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/253,052

(22) Filed: Jun. 27, 2025

(65) Prior Publication Data

US 2025/0322708 A1 Oct. 16, 2025

Related U.S. Application Data

(63) Continuation of application No. 18/197,391, filed on May 15, 2023, now Pat. No. 12,367,728.

(30) Foreign Application Priority Data

Sep. 7, 2022 (IN) ............................ 202211051092

(51) Int. Cl.

| | |
|---|---|
| ***G07C 13/00*** | (2006.01) |
| ***H04L 9/32*** | (2006.01) |

(52) U.S. Cl.

CPC ........... *G07C 13/00* (2013.01); *H04L 9/3231* (2013.01)

(58) Field of Classification Search

CPC ... H04L 9/3231; G07C 13/00; G06Q 2230/00
See application file for complete search history.

(56) References Cited

U.S. PATENT DOCUMENTS

| | | | |
|---|---|---|---|
| 2019/0288846 A1 | 9/2019 | Zawierka | |
| 2020/0258338 A1 | 8/2020 | Goswami et al. | |
| 2022/0239502 A1 * | 7/2022 | Anderson | H04L 9/3257 |

FOREIGN PATENT DOCUMENTS

| | | | |
|---|---|---|---|
| WO | WO-2021183677 A1 * | 9/2021 | H04L 9/50 |

* cited by examiner

*Primary Examiner* — Laura A Gudorf
(74) *Attorney, Agent, or Firm* — Greenblum & Bernstein, P.L.C.

(57) ABSTRACT

A method for performing a determination of voter eligibility and facilitation of secure electronic voting is provided. The method includes authenticating a voter according to security setting and displaying a voting page for a jurisdiction corresponding to the voter's residence. The method then transmits to an adjudicating entity, voter information for determination of voter eligibility, and stores the voter information in a non-public blockchain. The method further includes determining whether the voter is eligible to vote based on the voter information stored in the non-public blockchain, generating a unique voter specific ballot for the voter in response to a determination that the voter is eligible to vote, and transmitting, to the adjudicating entity, a ballot selection received from the voter. The ballot selection is then stored on a public blockchain, and made available for release.

20 Claims, 6 Drawing Sheets

300

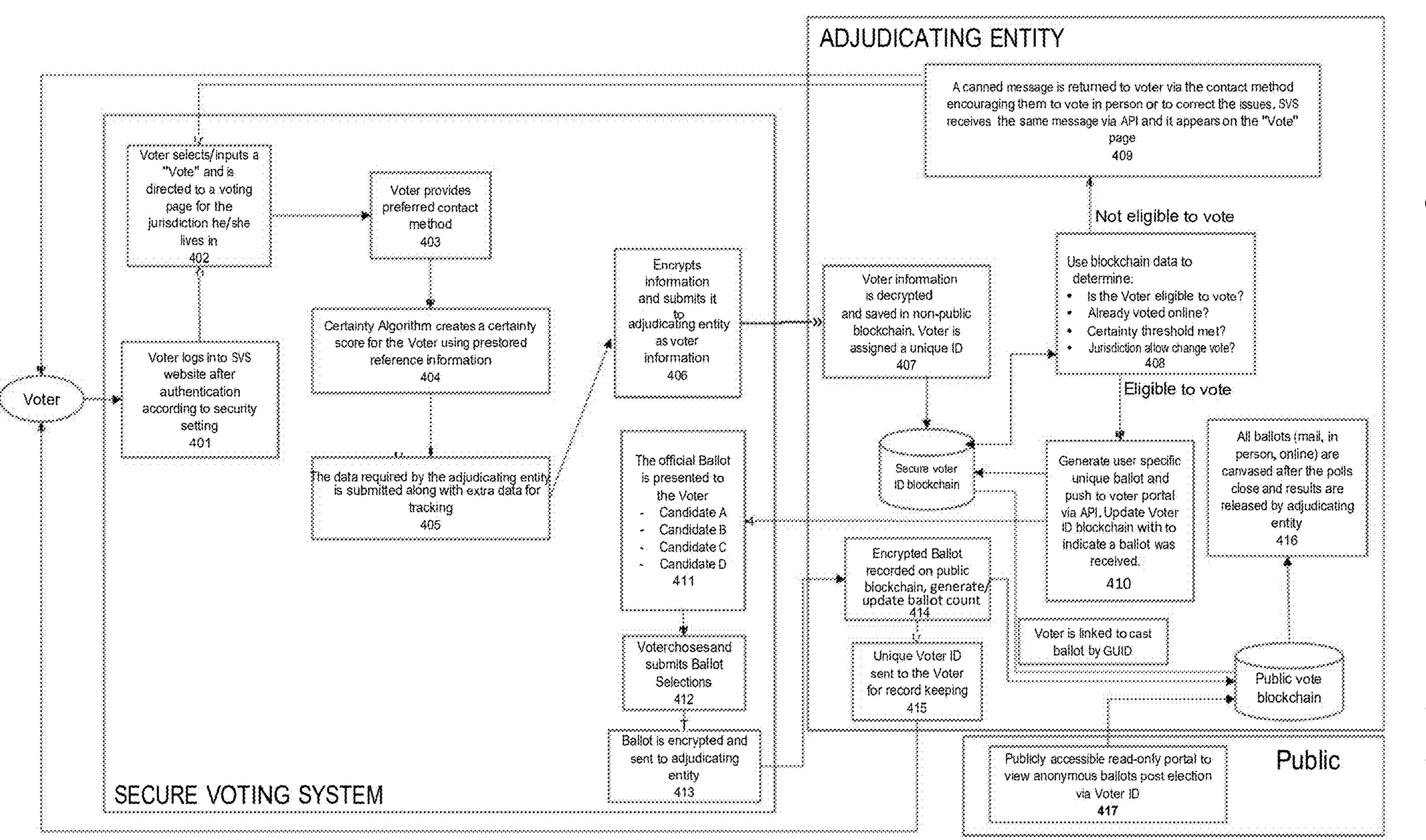
FIG. 4
ADJUDICATING ENTITY
SECURE VOTING SYSTEM
Public
Voter
Voter logs into SVS website after authentication according to security setting 401
Voter selects/inputs a "Vote" and is directed to a voting page for the jurisdiction he/she lives in 402
Voter provides preferred contact method 403
Certainty Algorithm creates a certainty score for the Voter using prestored reference information 404
The data required by the adjudicating entity is submitted along with extra data for tracking 405
Encrypts information and submits it to adjudicating entity as voter information 406
Voter information is decrypted and saved in non-public blockchain. Voter is assigned a unique ID 407
Secure voter ID blockchain
Use blockchain data to determine:
Is the Voter eligible to vote?
Already voted online?
Certainty threshold met?
Jurisdiction allow change vote?
408
Not eligible to vote
Eligible to vote
A canned message is returned to voter via the contact method encouraging them to vote in person or to correct the issues. SVS receives the same message via API and it appears on the "Vote" page 409
Generate user specific unique ballot and push to voter portal via API. Update Voter ID blockchain with to indicate a ballot was received. 410
The official Ballot is presented to the Voter
Candidate A
Candidate B
Candidate C
Candidate D
411
Voterchosesand submits Ballot Selections 412
Ballot is encrypted and sent to adjudicating entity 413
Encrypted Ballot recorded on public blockchain, generate/ update ballot count 414
Unique Voter ID sent to the Voter for record keeping 415
Voter is linked to cast ballot by GUID
All ballots (mail, in person, online) are canvased after the polls close and results are released by adjudicating entity 416
Public vote blockchain
Publicly accessible read-only portal to view anonymous ballots post election via Voter ID 417

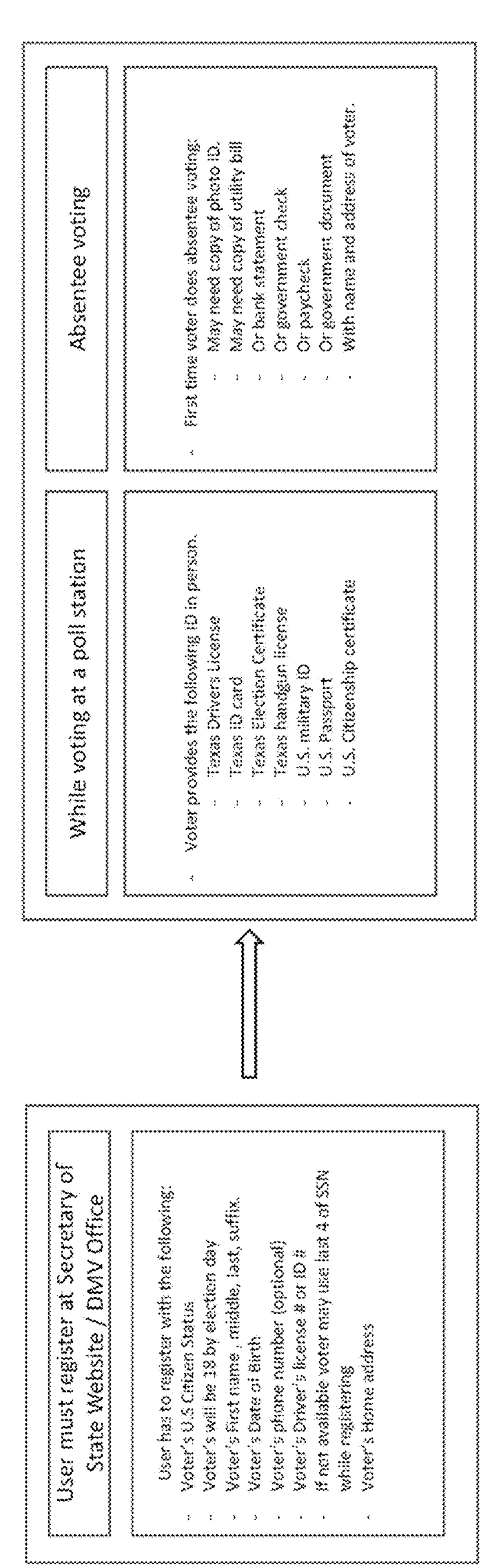
FIG. 5

FIG. 6

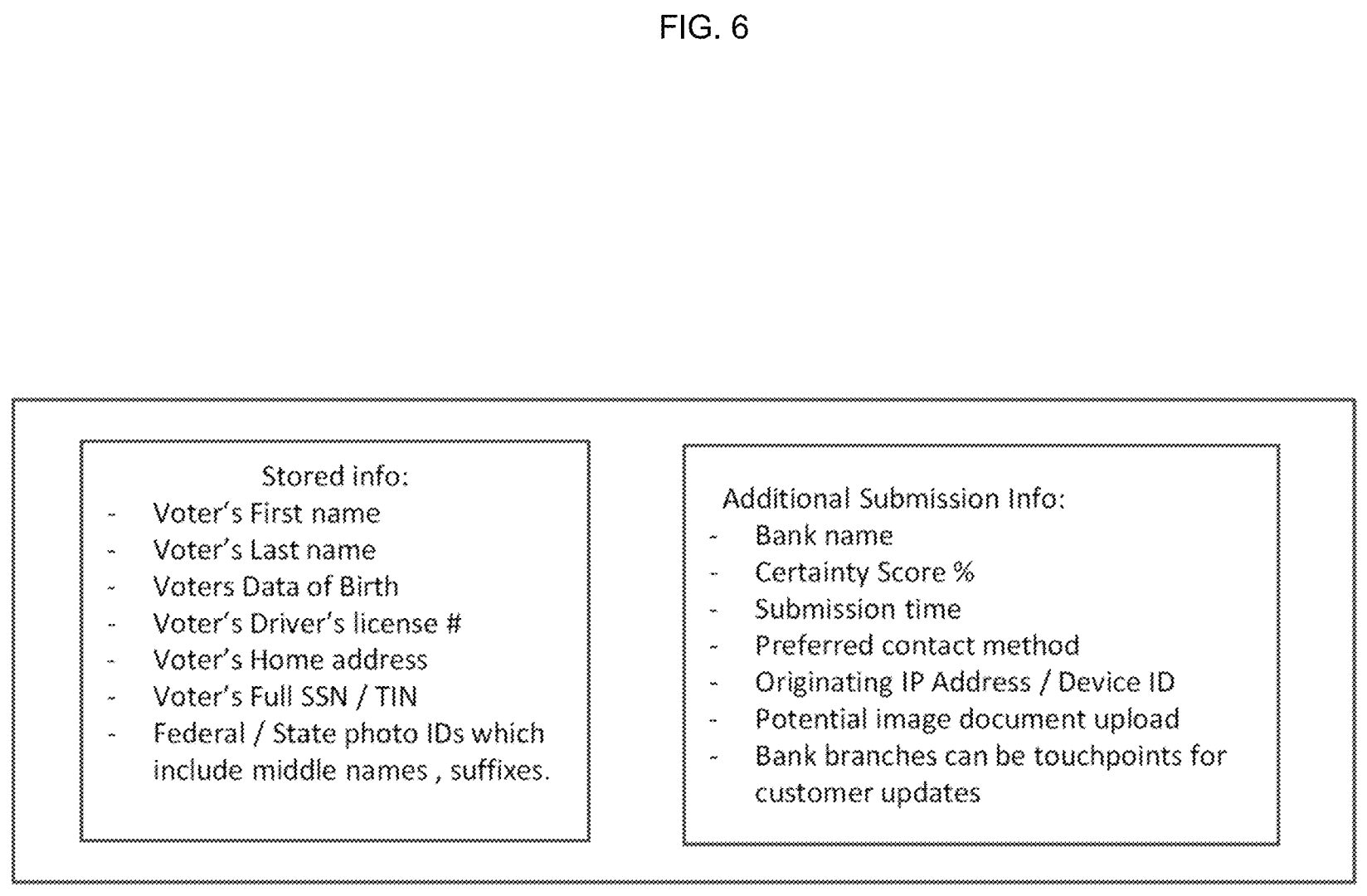

Stored info:

- Voter's First name
- Voter's Last name
- Voters Data of Birth
- Voter's Driver's license #
- Voter's Home address
- Voter's Full SSN / TIN
- Federal / State photo IDs which include middle names , suffixes.

Additional Submission Info:

- Bank name
- Certainty Score %
- Submission time
- Preferred contact method
- Originating IP Address / Device ID
- Potential image document upload
- Bank branches can be touchpoints for customer updates

SYSTEM AND METHOD FOR DETERMINING VOTER ELIGIBILITY AND FACILITATING SECURE ELECTRONIC VOTING

CROSS-REFERENCE TO RELATED APPLICATIONS

This application is a continuation of U.S. patent application Ser. No. 18/197,391, filed May 15, 2023, which claims priority benefit from Indian application Ser. No. 202211051092, filed Sep. 7, 2022, which is hereby incorporated by reference in its entirety.

TECHNICAL FIELD

This disclosure generally relates to providing a system and method for facilitating a secure vote casting. More specifically, the present disclosure is directed to leveraging a system that pre-stores voter information for facilitating a secure vote casting.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

For many years there has been growing distrust in U.S. election results at various levels, regional and national, due to the patchwork of laws and allegations of fraud. Accordingly, a secure infrastructure for facilitating secure and reliable voting information may be desired to remove concerns of legitimacy of voting results.

SUMMARY

According to an aspect of the present disclosure, a method for performing a determination of voter eligibility and facilitation of secure electronic voting is provided. The method includes performing, using a processor and a memory: logging into a website of a secure voting system using voter's login information; authenticating the voter according to security setting; receiving, from the voter, a selection for performing a voting operation; displaying a voting page for a jurisdiction corresponding to the voter's residence; determining a certainty score for the voter using prestored information in the secure voting system; generating submission information for the voter; transmitting, to an adjudicating entity, voter information for determination of voter eligibility, the voter information including at least biographical information of the voter, the certainty score and the submission information; storing, by the adjudicating entity, the voter information in a non-public blockchain; determining, by the adjudicating entity, whether the voter is eligible to vote based on the voter information stored in the non-public blockchain; generating, by the adjudicating entity, a unique voter specific ballot for the voter in response to a determination that the voter is eligible to vote; transmitting, from the adjudicating entity and to the secure voting system, the unique voter specific ballot; receiving, from the voter, a ballot selection on the unique voter specific ballot; transmitting, to the adjudicating entity, the ballot selection; storing, by the adjudicating entity and on a public blockchain, the ballot selection; and releasing, by the adjudicating entity, the ballot selection stored on the public blockchain.

According to another aspect of the present disclosure, the method further includes receiving, from the voter, an input indicating a preferred contact method.

According to another aspect of the present disclosure, contact information corresponding to the preferred is prestored in the secure voting system.

According to yet another aspect of the present disclosure, the voter is linked to the ballot selection by a globally unique identifier.

According to another aspect of the present disclosure, the method further includes transmitting, to the secure voting system, an automated message indicating that the voter is ineligible to vote, in response to a determination that the voter is ineligible to vote.

According to a further aspect of the present disclosure, the submission information includes at least one of an identification of an organization though which the voter is requesting to cast a ballot, a time of submission, a preferred contact method, originating IP address, originating device identifier, an authenticating image and updated voter information.

According to yet another aspect of the present disclosure, the prestored information includes at least one of the voter's first name, last name, middle name, prefix, suffix, date of birth, driver license number, home address, social security number, tax payer identification number, and a photo identification.

According to a further aspect of the present disclosure, the authenticating image includes at least one of a facial image or an iris scan image captured in performing the authenticating.

According to another aspect of the present disclosure, the photo identification includes a state or federal government issued identification.

According to a further aspect of the present disclosure, the adjudicating entity sets a requisite certainty score to determine whether the voter is eligible to vote.

According to a further aspect of the present disclosure, the voter is determined to be eligible to vote when data stored in the non-public blockchain indicates that the voter did not vote previously for a respective election.

According to a further aspect of the present disclosure, the voter is determined to be eligible to vote when the certainty score is determined to be at or above a reference threshold.

According to a further aspect of the present disclosure, the prestored information of the voter is stored by a third party organization to which the voter is a member.

According to a further aspect of the present disclosure, the third party organization is a bank.

According to a further aspect of the present disclosure, the method further includes determining, by the adjudicating party, whether the jurisdiction permits the voter to change the ballot selection that was provided previously.

According to a further aspect of the present disclosure, the method further includes when the jurisdiction is determined to permit the voter to change the ballot selection, determining that the voter is eligible to vote again.

According to a further aspect of the present disclosure, the method further includes in response to determining that the voter is eligible to vote again, increase a vote count for the voter on the public blockchain.

According to a further aspect of the present disclosure, the method further includes generating, by the adjudicating entity, a subsequent unique voter specific ballot for the voter; transmitting, from the adjudicating entity and to the secure voting system, the subsequent unique voter specific ballot;

receiving, from the voter, a subsequent ballot selection on the subsequent unique voter specific ballot; transmitting, to the adjudicating entity, the subsequent ballot selection; storing, by the adjudicating entity and on a public blockchain, a history of ballot selections, the history of ballot selections including the ballot selection and the subsequent ballot selection; and releasing, by the adjudicating entity, the subsequent ballot selection stored on the public blockchain.

According to another aspect of the present disclosure, a system for performing a determination of voter eligibility and facilitation of secure electronic voting is disclosed. The system includes a secure voting system including a processor, a memory and a communication circuit; and an adjudicating entity including a processor, a memory and a communication circuit. The at least one processor is configured to perform: logging into a website of the secure voting system using voter's login information; authenticating the voter according to security setting; receiving, from the voter, a selection for performing a voting operation; displaying a voting page for a jurisdiction corresponding to the voter's residence; determining a certainty score for the voter using prestored information in the secure voting system; generating submission information for the voter; transmitting, to the adjudicating entity, voter information for determination of voter eligibility, the voter information including at least biographical information of the voter, the certainty score and the submission information; storing, by the adjudicating entity, the voter information in a non-public blockchain; determining, by the adjudicating entity, whether the voter is eligible to vote based on the voter information stored in the non-public blockchain; generating, by the adjudicating entity, a unique voter specific ballot for the voter in response to a determination that the voter is eligible to vote; transmitting, from the adjudicating entity and to the secure voting system, the unique voter specific ballot; receiving, from the voter, a ballot selection on the unique voter specific ballot; transmitting, to the adjudicating entity, the ballot selection; storing, by the adjudicating entity and on a public blockchain, the ballot selection; and releasing, by the adjudicating entity, the ballot selection stored on the public blockchain.

According to another aspect of the present disclosure, a non-transitory computer readable storage medium that stores a computer program for performing a determination of voter eligibility and facilitation of secure electronic voting is disclosed. The computer program, when executed by a processor, causing a system including a secure voting system and an adjudicating entity to perform a process including logging into a website of the secure voting system using voter's login information; authenticating the voter according to security setting; receiving, from the voter, a selection for performing a voting operation; displaying a voting page for a jurisdiction corresponding to the voter's residence; determining a certainty score for the voter using prestored information in the secure voting system; generating submission information for the voter; transmitting, to the adjudicating entity, voter information for determination of voter eligibility, the voter information including at least biographical information of the voter, the certainty score and the submission information; storing, by the adjudicating entity, the voter information in a non-public blockchain; determining, by the adjudicating entity, whether the voter is eligible to vote based on the voter information stored in the non-public blockchain; generating, by the adjudicating entity, a unique voter specific ballot for the voter in response to a determination that the voter is eligible to vote; transmitting, from the adjudicating entity and to the secure voting system, the unique voter specific ballot; receiving, from the voter, a ballot selection on the unique voter specific ballot; transmitting, to the adjudicating entity, the ballot selection; storing, by the adjudicating entity and on a public blockchain, the ballot selection; and releasing, by the adjudicating entity, the ballot selection stored on the public blockchain.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 illustrates a method for validating voter eligibility and electronically casting a ballot in accordance with an exemplary embodiment.

FIG. 5 illustrates basis requirements for casting ballot via a traditional system.

FIG. 6 illustrates information already stored by SVS and additional information generated by the SVS for submission to an adjudicating entity in accordance with an exemplary embodiment.

DETAILED DESCRIPTION

Figure 1:
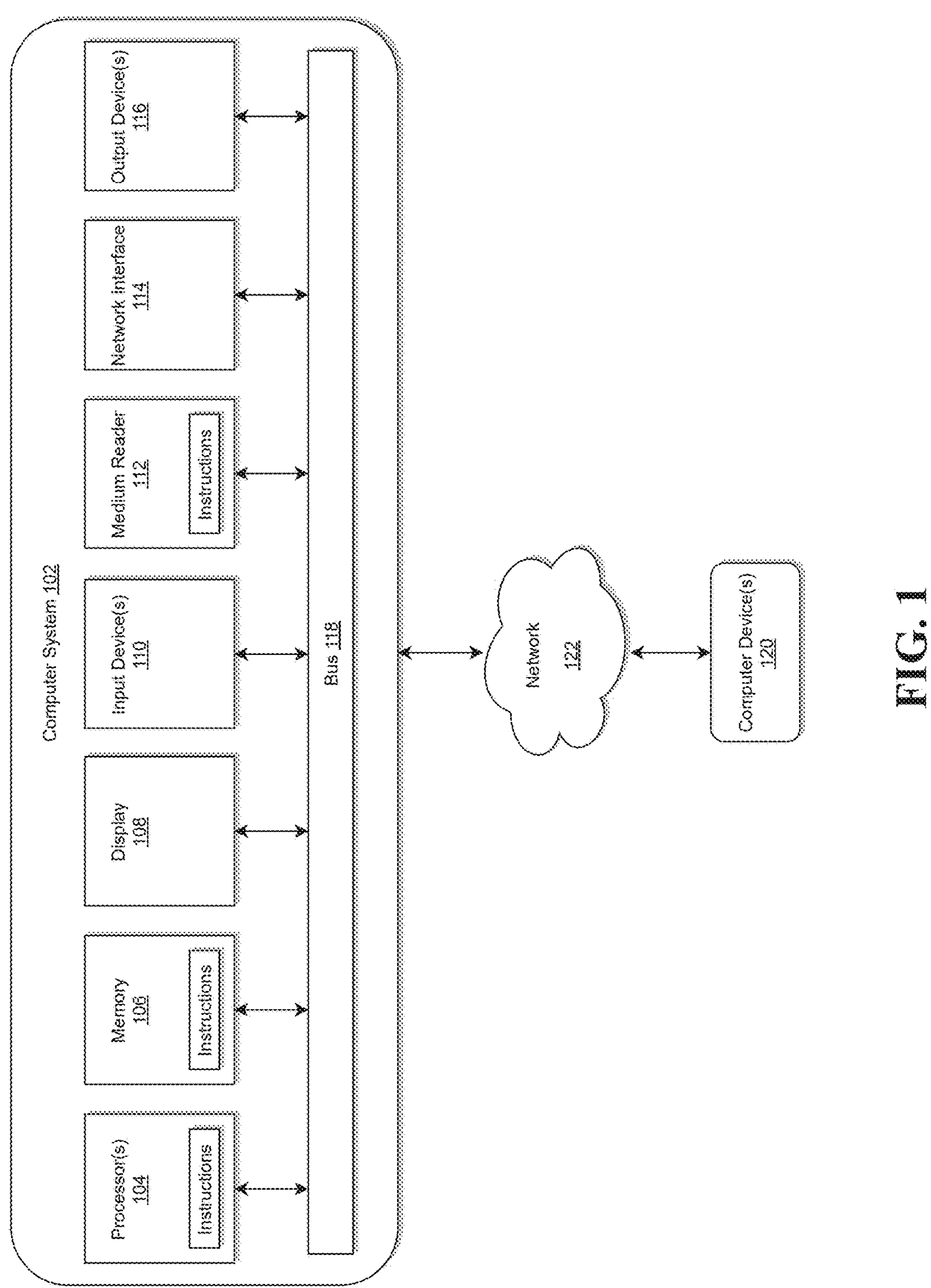
FIG. 1 illustrates a computer system for implementing a secure voting system (SVS) in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a secure voting system (SVS) in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
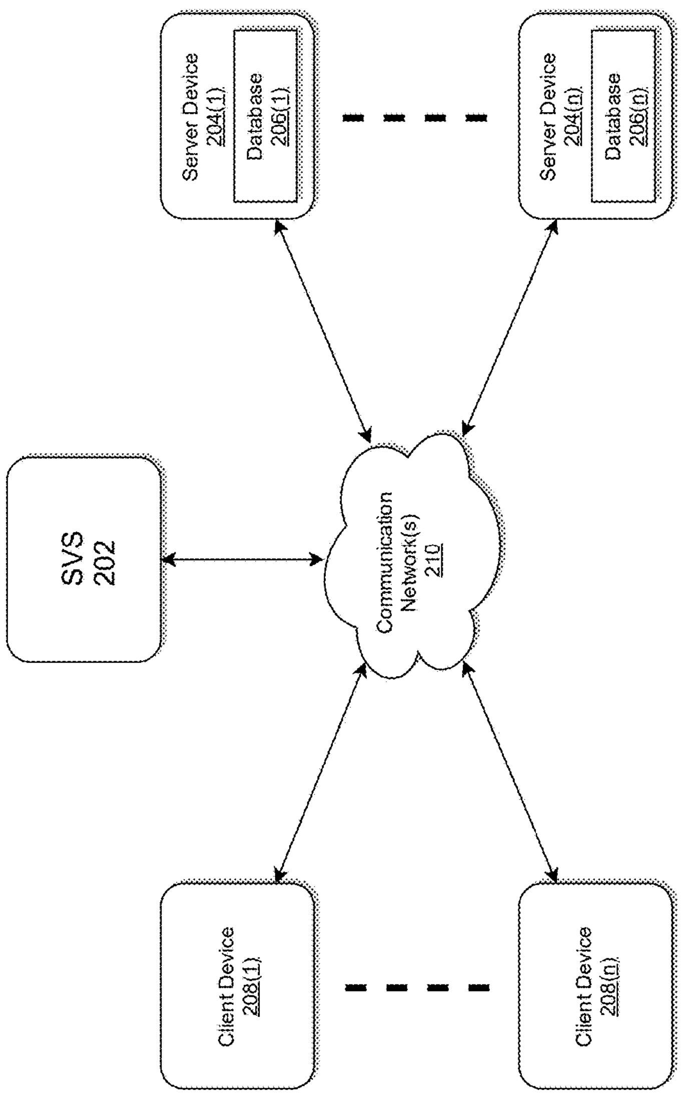
FIG. 2 illustrates an exemplary diagram of a network environment with a SVS in accordance with an exemplary embodiment.

FIG. 2 illustrates an exemplary diagram of a network environment with a SVS in accordance with an exemplary embodiment.

A SVS 202 may be implemented with one or more computer systems similar to the computer system 102 as described with respect to FIG. 1.

The SVS 202 may store one or more applications that can include executable instructions that, when executed by the SVS 202, cause the SVS 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the SVS 202 itself, may be located in virtual server(s) running in a cloud-based computing environment rather than being tied to one or more specific physical network computing devices. Also, the application(s) may be running in one or more virtual machines (VMs) executing on the SVS 202. Additionally, in one or more embodiments of this technology, virtual machine(s) running on the SVS 202 may be managed or supervised by a hypervisor.

In the network environment 200 of FIG. 2, the SVS 202 is coupled to a plurality of server devices 204(1)-**204(*n*) that hosts a plurality of databases 206(1)-206(*n*), and also to a plurality of client devices 208(1)-208(*n*) via communication network(s) 210. According to exemplary aspects, databases 206(1)-206(*n*) may be configured to store data that relates to distributed ledgers, blockchains, user account identifiers, biller account identifiers, and payment provider identifiers. A communication interface of the SVS 202, such as the network interface 114 of the computer system 102 of FIG. 1, operatively couples and communicates between the SVS 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SVS 202, the server devices 204(1)-**204(*n*), and/or the client devices 208(1)-208(*n*) may be coupled together via other topologies. Additionally, the network environment 200** may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SVS 202 may be a standalone device or integrated with one or more other devices or apparatuses, such as one or more of the server devices 204(1)-204(*n*), for example. In one particular example, the SVS 202 may be hosted by one of the server devices 204(1)-204(*n*), and other arrangements are also possible. Moreover, one or more of the devices of the SVS 202 may be in the same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the SVS 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

According to exemplary embodiments, the client devices 208(1)-208(*n*) in this example may include any type of computing device that can facilitate the implementation of the SVS 202 that may efficiently provide a platform for implementing a cloud native SVS module, but the disclosure is not limited thereto.

The client devices 208(1)-208(*n*) may run interface applications, such as standard web browsers or standalone client applications, which may provide an interface to communicate with the SVS 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the SVS 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SVS 202, the server devices 204(1)-204(*n*), or the client devices 208(1)-208(*n*), for example, may be configured to operate as virtual instances on the same physical machine. For example, one or more of the SVS 202, the server devices 204(1)-204(*n*), or the client devices 208(1)-208(*n*) may operate on the same physical device rather than as separate devices communicating through communication network(s) 210. Additionally, there may be more or fewer SVS 202, server devices 204(1)-204(*n*), or client devices 208(1)-208(*n*) than illustrated in FIG. 2. According to exemplary embodiments, the SVS 202 may be configured to send code at run-time to remote server devices 204(1)-204(*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
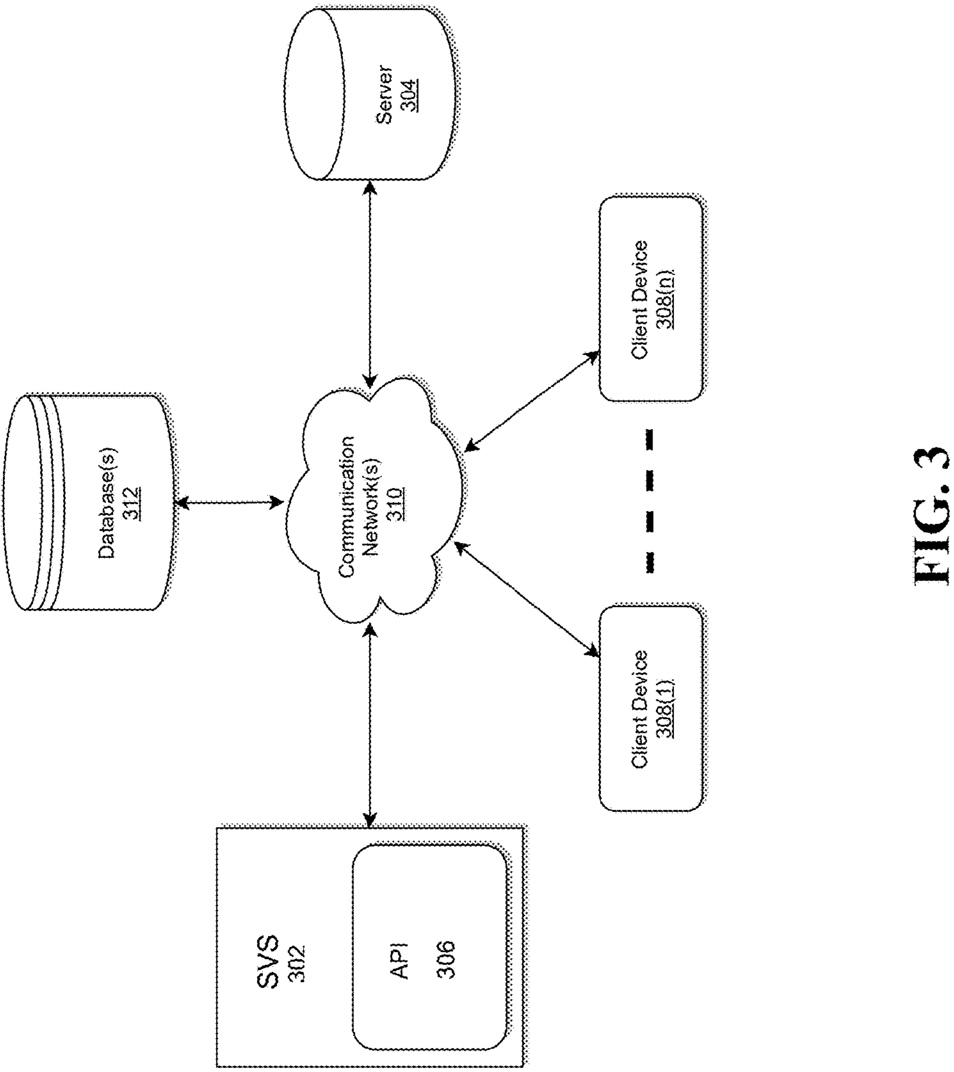
FIG. 3 illustrates a system diagram for implementing a SVS in accordance with an exemplary embodiment.

FIG. 3 illustrates a system diagram for implementing a SVS in accordance with an exemplary embodiment.

As illustrated in FIG. 3, the system 300 may include a SVS 302 within which a group of API modules 306 is embedded, a server 304, a database(s) 312, a plurality of client devices 308(1) . . . 308(*n*), and a communication network 310.

According to exemplary embodiments, the SVS 302 including the API modules 306 may be connected to the server 304, and the database(s) 312 via the communication network 310. Although there is only one database has been illustrated, the disclosure is not limited thereto. Any number of databases may be utilized. The SVS 302 may also be connected to the plurality of client devices 308(1) . . . 308(*n*) via the communication network 310, but the disclosure is not limited thereto.

According to exemplary embodiment, the SVS 302 is described and shown in FIG. 3 as including the API modules 306, although it may include other rules, policies, modules, databases, or applications, for example. According to exemplary embodiments, the database(s) 312 may be embedded within the SVS 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . **308(*n*) via the communication network 310**.

The API modules 306 may be configured to implement a user interface (UI) platform that is configured to enable SVS as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . **308(*n*) are illustrated as being in communication with the SVS 302. In this regard, the plurality of client devices 308(1) . . . 308(*n*) may be "clients" of the SVS 302 and are described herein as such. Nevertheless, it is to be known and understood that the plurality of client devices 308(1) . . . 308(*n*) need not necessarily be "clients" of the SVS 302, or any entity described in association therewith herein. Any additional or alternative relationship may exist between either or both of the plurality of client devices 308(1) . . . 308(*n*) and the SVS 302**, or no relationship may exist.

The first client device 308(1) may be, for example, a smart phone. Of course, the first client device 308(1) may be any additional device described herein. The second client device **308(*n*) may be, for example, a personal computer (PC). Of course, the second client device 308(*n*) may also be any additional device described herein. According to exemplary embodiments, the server 304 may be the same or equivalent to the server device 204 as illustrated in FIG. 2**.

The process may be executed via the communication network 310, which may comprise plural networks as described above. For example, in an exemplary embodiment, one or more of the plurality of client devices 308(1) . . . **308(*n*) may communicate with the SVS 302** via broadband or cellular communication. Of course, these embodiments are merely exemplary and are not limiting or exhaustive.

The computing device 301 may be the same or similar to any one of the client devices 208(1)-**208(*n*) as described with respect to FIG. 2, including any features or combination of features described with respect thereto. The SVS 302 may be the same or similar to the SVS 202 as described with respect to FIG. 2**, including any features or combination of features described with respect thereto.

FIG. 4 illustrates a method for validating voter eligibility and electronically casting a ballot in accordance with an exemplary embodiment.

Blockchain and other technologies may be utilized to increase trust in election results, as well as any event that require its legitimacy in voting results to be ensured. However, building a uniform infrastructure and machines necessary for collecting votes from eligible voters may be a large undertaking that may not be feasible. However, if an existing infrastructure may be leveraged, blockchain and other technologies may be leveraged to collect immutable votes for legitimizing voting results.

In operation 401, a user or voter logs into a SVS after being authenticated in accordance with security settings. According to exemplary aspects, the SVS may leverage an existing infrastructure, such as a banking system that may already store personal information associated with the voter. In an example, authentication may include providing at least one of a username and password, biometric information (e.g., voice scan, iris scan, fingerprint scan, face scan and/or etc.), security token, and the like. During the authenticating process, an authentication image (e.g., facial image, iris scan, fingerprint scan) may be captured. According to exemplary aspects, level of security may be the same or different for the transaction being conducted via the existing infrastructure. For example, the existing infrastructure may require one or two-step authentication for performing normal transactions, but may require more for performing different transactions, such as voting for a government official.

In operation 402, the user selects an option to submit a vote in an election. In an example, the user may specify the election for casting a ballot.

In operation 403, the user provides preferred contact method. For example, the preferred contact method may specify phone call, email or text. Further, in another example, email address and phone number information may already be stored for the user in the existing infrastructure. However, aspects of the present disclosure are not limited thereto, such that the user may have an option to input the user's preferred contact information as well as the method.

In operation 404, a certainty algorithm is executed for generating a certainty score for the voter using information already stored by the existing infrastructure. The certainty score may be provided as a percentage, a grade, a numerical value or the like. The information corresponding to the voter prestored by the existing infrastructure may be referred to as reference information. In an example, the reference information may include, without limitation, voter's first name, last name, suffix/prefix, driver license number, home address, social security number, taxpayer identification number and the like.

According to exemplary aspects the certainty algorithm may be a static algorithm that may be updated as necessary, or it may be an artificial intelligence (AI) or machine learning (ML) algorithm that may evolve as it processes more information.

Generally, AI or ML algorithms may be executed to perform data pattern detection, and to provide an output or render a decision based on the data pattern detection. More specifically, an output may be provided based on a historical pattern of data, such that with more data or more recent data, more accurate outputs and/or decisions may be provided or rendered. Accordingly, the ML or AI models may be constantly updated after a predetermined number of runs or iterations. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, k-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

In operation 405, additional submission information, such as data required by the government entity along with tracking information, may be combined with the biographic information of the voter, and the certainty score as voter information for submission. For example, the addition submission information may include, without limitation, identity of the existing infrastructure (e.g., bank), submission time, originating IP address, and the like.

In operation 406, the voter information is then encrypted and submitted to an adjudicating entity, such as a government (e.g., local, state, and/or national) entity. Although government entities are indicated as being the adjudicating entity, aspects of the present disclosure are not limited thereto, such that the adjudicating entity may be any entity that may hold an election, including a private organization or volunteer groups.

In operation 407, the voter information is then received by the adjudicating entity and decrypted. The decrypted voter information is then saved in a non-public blockchain, such as a secure voter ID blockchain. The voter included in the voter information is then assigned a unique ID.

In operation 408, the adjudicating entity access the non-public block chain and uses data included in the blockchain to make one or more determinations with respect to the voter to decide whether or not the voter is eligible to vote. For example, the determinations may include, without limitation, whether or not the voter is eligible to vote, whether or not the voter already voted online or via other avenue (e.g., in-person, mail-in ballot and the like), whether or not the adjudicating entity's certainty threshold has been met and the like. In an example, the adjudicating entity may set the certainty threshold.

Further, determination of whether the voter is eligible to vote may include consideration of whether the jurisdiction in which the voter is registered to vote allows the voter to change or update his or her vote during a voting period. For example, one state may allow the voter to change or update his or her vote up until end of the voting period, while another state may only allow for a single vote which may not be allowed to be changed once submitted. In an example, change of vote or submission of additional ballots during the voting period, if permitted by a respective jurisdiction, may be managed using a flag indicating additional voter ballots using a true/false value in a configuration utilized by a adjudicating entity.

In operation 409, if the adjudicating entity decides that the voter is not eligible to vote, a canned message is returned to the voter via the contact method specified by the voter. The canned message may specify why the voter is not eligible to vote or why the vote submission by the voter is rendered invalid. The canned message may also encourage the voter to vote by alternative methods, if available, or specify an issue to correct. Further, the SVS may also receive the same message via an API, which may appear on the voting page.

In operation 410, if the voter is determined to be eligible to vote or the vote submitted by the voter is deemed legitimate, user specific unique ballot is generated and pushed to the voter portal provided on the SVS via an API. Further, the voter ID blockchain may be generated to indicate that a valid ballot was received. Moreover, the voter ID blockchain may also indicate whether the voter is submitting a first ballot submission or is attempting to submit an additional ballot for updating or changing a previous ballot or vote submission.

In operation 411, the official ballot is presented to the voter by the SVS. In an example, the official ballot may present various candidates for selection (e.g., Candidate A, Candidate B, Candidate C and Candidate D). In an example, the official ballot may be in an electronic form or in any other suitable form that is deemed to be acceptable by the adjudicating entity.

In operation 412, voter selects one of the candidates by providing an input on the electronic official ballot. For example, a candidate may be selected by, without limitation, clicking on a virtual button, clicking on a radio button, typing a name of the selected candidate and the like.

In operation 413, the electronic ballot is then encrypted and sent to the adjudicating entity over a network.

In operation 414, the adjudicating entity records the encrypted ballot on the public blockchain and updates or generates a vote or ballot count. If the ballot is being casted for the first time, a vote or ballot count of 1 may be generated. If the ballot being casted is an additional ballot, then a previous vote or ballot count may be incremented by 1. In an example, the voter may be linked to cast ballot by a globally unique identifier (GUID). GUID may refer to a 128-bit number created by an operating system to uniquely identify specific components, hardware, software, files, user accounts, database entries and other items. Although GUID is disclosed as being utilized for casting the ballot, aspects of the disclosure are not limited thereto, such that other identifiers that securely identify a voter may be utilized.

Moreover, the adjudicating entity may record a vote count corresponding to the electronic ballot and its history on the public blockchain. In an example, the ballot data in the public blockchain includes an incrementing value for a ballot number field. Further, initial vote count or ballot number may include an initial value of 1 in the ballot number field.

If a jurisdiction allows for submission of additional voter ballots, additional ballot case submitted by a respective voter may increment the ballot number or count. For example, when a voter submits a ballot for candidate A after previously submitting a ballot for candidate B in the same election, the blockchain for the respective voter may indicate a vote count or ballot number of 2 and a history of ballot selections. The last vote or ballot selection recorded in the blockchain when the voting period ends will be recorded as the final vote or ballot selection that will be utilized for determining voting results. In other words, ballot or vote corresponding to the highest ballot count would be determined as the official ballot or vote during the final canvasing. However, aspects of the present disclosure are not limited thereto, such that a voter's ballot with the most recent timestamp may be used. All cast ballots may remain on the blockchain permanently even if a newer ballot is cast.

Moreover, according to exemplary aspects, if a jurisdiction allows for ballot changes (or submission of additional voter ballots for updating a previous vote), and a voter casts a physical ballot as well as an online ballot using the secure voting system of FIG. 4, the jurisdiction may leverage its existing systems to detect if voter case multiple ballots and which ballot to use in the final ballot count.

In operation 415, a unique voter ID is sent to the voter for record keeping. However, aspects of the present disclosure not limited thereto, such that one-time voter ID may be utilized.

In operation 416, all of the ballots collected may be canvased after the polls close and results may be released by the adjudicating entity. According to exemplary aspects, ballots may be cast electronically, in-person, via physical mail and the like.

In operation 418, access may be provided to a publicly accessible read-only portal to view anonymous ballots post-election via Voter ID.

FIG. 5 illustrates basis requirements for casting ballot via a traditional system.

FIG. 5 provides that user must first register with a governmental entity, such as the state of Texas. In an example, the user may register at the secretary of state website or at a local department of motor vehicles (DMV) office. User may be required to verify that the voter's citizenship status, age at the time of election being registered for. And the like. User may also be required to provider user's personal information, such as first name, last name, middle name, prefix/suffix, date of birth, phone number, driver license information or state issued identification information, home address, social security number (whole or partial) and the like. Information required for registration may vary from jurisdiction to jurisdiction and may not be uniform.

Upon registration, the voter may be required to provide additional information. For example, if the voter is voting at a poll station in Texas, the voter may be required to provide one or more of identification documents before the user is allowed to cast a ballot. The identification documents may include Texas driver license, Texas identification card, Texas election certificate, Texas handgun license, U.S. military identification, U.S. Passport, U.S. citizenship certificate and the like.

On the other hand, if the voter is to cast an absentee ballot for the first time, the voter may be required to provide a copy of a photo identification, and a copy of one of the following including the voter's name: a utility bill, a bank statement, a government check, a paycheck or a government document.

FIG. 6 illustrates information already stored by SVS and additional information generated by the SVS for submission to an adjudicating entity in accordance with an exemplary embodiment.

In contrast to the system illustrated in in FIG. 5, FIG. 6 illustrates that voter's identification or biographic information is already prestored by the SVS. In an example, the SVS may leverage existing infrastructure that may be utilized by a respective voter, such as a bank. The identification or biographic information of the voter may include, without limitation, voter's first name, last name, date of birth, driver license number or state issued identification card, home address, full social security number, an image of a federal/state issued photo identification card/document including voter's middle name, prefix/suffix, sex and the like. According to exemplary aspects, the federal/state issued photo identification card/document may include identifying documents that may be used to open an account at a financial institution (e.g., driver license, state issued identification card, U.S. passport, U.S. naturalization certificate and the like).

Further, prior to submission of voter information to the adjudicating entity for verifying eligibility of the respective voter, additional submission information may be generated by the SVS. In an example, the additional submission information may include, without limitation, name of the bank submitting the voter information, certainty score, submission time, preferred contact method, originating IP address and/or device identifier, potential image document upload (e.g., facial image captured by the bank, iris scan, image of one or more documents and the like). Moreover, any updates to the voter information acquired by the bank (e.g., divorced or widowed status), if relevant, may additionally be provided to the adjudicating entity. By providing additionally generated information along with previously verified voter information, fraudulent voter registration and/or ballots may be avoided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing a determination of voter eligibility and facilitation of secure electronic voting, the method comprising:

logging into a website of a secure voting system using login information of a voter;

authenticating the voter according to a security setting;

displaying a voting page corresponding to the login information of the voter;

determining a certainty score for the voter using prestored information in the secure voting system;

transmitting, to an adjudicating entity, voter information for determination of voter eligibility, the voter information including at least biographical information of the voter, and the certainty score;

storing, by the adjudicating entity, the voter information in a first blockchain;

determining, by the adjudicating entity, whether the voter is eligible to vote based on the voter information stored in the first blockchain;

generating, by the adjudicating entity, a unique voter specific record for the voter in response to a determination that the voter is eligible to vote;

transmitting, from the adjudicating entity and to the secure voting system, the unique voter specific record;

receiving, from the voter, a selection on the unique voter specific record;

transmitting, to the adjudicating entity, the selection by the voter;

storing, by the adjudicating entity and on a second blockchain, the selection by the voter; and releasing, by the adjudicating entity, the selection by the voter stored on the second blockchain.

2. The method according to claim 1, further comprising: receiving, from the voter, an input indicating a preferred contact method.

3. The method according to claim 2, wherein contact information corresponding to the preferred contact method is prestored in the secure voting system.

4. The method according to claim 1, wherein the voter is linked to the selection by a globally unique identifier.

5. The method according to claim 1, further comprising: transmitting, to the secure voting system, an automated message indicating that the voter is ineligible to vote, in response to a determination that the voter is ineligible to vote.

6. The method according to claim 1, wherein the voter information includes at least one of an identification of an organization through which the voter is requesting to cast the selection, a preferred contact method, originating IP address, originating device identifier, an authenticating image and updated voter information.

7. The method according to claim 1, wherein the prestored information includes at least one of a first name, last name, middle name, prefix, suffix, date of birth, driver license number, home address, social security number, tax payer identification number, and photo identification of the voter.

8. The method according to claim 6, wherein the authenticating image includes at least one of a facial image or an iris scan image captured in performing the authenticating.

9. The method according to claim 7, wherein the photo identification includes a state or federal government issued identification.

10. The method according to claim 1, wherein the adjudicating entity sets a requisite certainty score to determine whether the voter is eligible to vote.

11. The method according to claim 1, wherein the voter is determined to be eligible to vote when data stored in the first blockchain indicates that the voter did not vote previously for a respective election.

12. The method according to claim 1, wherein the voter is determined to be eligible to vote when the certainty score is determined to be at or above a reference threshold.

13. The method according to claim 1, wherein the prestored information of the voter is stored by a third party organization to which the voter is a member.

14. The method according to claim 13, wherein the third party organization is a bank.

15. The method according to claim 1, further comprising: determining, by the adjudicating entity, whether the voter is permitted to change the selection by the voter.

16. The method according to claim 15, further comprising:
when the voter is determined to be permitted to change the selection by the voter, determining that the voter is eligible to vote again.

17. The method according to claim 16, further comprising:
in response to determining that the voter is eligible to vote again, increase a vote count for the voter on the second blockchain.

18. The method according to claim 17, further comprising:
generating, by the adjudicating entity, a subsequent unique voter specific ballot for the voter;
transmitting, from the adjudicating entity and to the secure voting system, the subsequent unique voter specific ballot;
receiving, from the voter, a subsequent ballot selection on the subsequent unique voter specific ballot;
transmitting, to the adjudicating entity, the subsequent ballot selection;
storing, by the adjudicating entity and on a second blockchain, a history of ballot selections, the history of ballot selections including the ballot selection and the subsequent ballot selection; and
releasing, by the adjudicating entity, the subsequent ballot selection stored on the second blockchain.

19. A system to perform a determination of voter eligibility and facilitation of secure electronic voting, the system comprising:
a secure voting system including a processor, a memory and a communication circuit; and
an adjudicating entity including a processor, a memory and a communication circuit;
wherein the system performs:
logging into a website of the secure voting system using login information of a voter;
authenticating the voter according to a security setting;
displaying a voting page corresponding to the login information of the voter;
determining a certainty score for the voter using prestored information in the secure voting system;
transmitting, to the adjudicating entity, voter information for determination of voter eligibility, the voter information including at least biographical information of the voter, and the certainty score;
storing, by the adjudicating entity, the voter information in a first blockchain;
determining, by the adjudicating entity, whether the voter is eligible to vote based on the voter information stored in the first blockchain;
generating, by the adjudicating entity, a unique voter specific record for the voter in response to a determination that the voter is eligible to vote;
transmitting, from the adjudicating entity and to the secure voting system, the unique voter specific record;
receiving, from the voter, a selection on the unique voter specific record;
transmitting, to the adjudicating entity, the selection by the voter;
storing, by the adjudicating entity and on a second blockchain, the selection by the voter; and
releasing, by the adjudicating entity, the selection by the voter stored on the second blockchain.

20. A non-transitory computer readable storage medium that stores a computer program for performing a determination of voter eligibility and facilitation of secure electronic voting, the computer program, when executed by a processor, causing a system including a secure voting system and an adjudicating entity to perform a process comprising:
logging into a website of the secure voting system using login information of a voter;
authenticating the voter according to a security setting;
displaying a voting page corresponding to the login information of the voter;
determining a certainty score for the voter using prestored information in the secure voting system;
transmitting, to the adjudicating entity, voter information for determination of voter eligibility, the voter information including at least biographical information of the voter, and the certainty score;
storing, by the adjudicating entity, the voter information in a first blockchain;
determining, by the adjudicating entity, whether the voter is eligible to vote based on the voter information stored in the first blockchain;

generating, by the adjudicating entity, a unique voter specific record for the voter in response to a determination that the voter is eligible to vote;

transmitting, from the adjudicating entity and to the secure voting system, the unique voter specific record;

receiving, from the voter, a ballot selection on the unique voter specific record;

transmitting, to the adjudicating entity, the selection by the voter;

storing, by the adjudicating entity and on a second blockchain, the selection by the voter; and releasing, by the adjudicating entity, the selection by the voter stored on the second blockchain.

* * * * *